(12) United States Patent  (10) Patent No.: US 7,510,376 B2
Lee et al.  (45) Date of Patent: Mar. 31, 2009

(54) SKEWED TIP HOLE TURBINE BLADE

(75) Inventors: Ching-Pang Lee, Cincinnati, OH (US);
Nicholas Charles Palmer, Loveland, OH (US); Kevin Lee Kirkeng, Milford, OH (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 11/211,391

(22) Filed: Aug. 25, 2005

(65) Prior Publication Data

US 2007/0237637 A1  Oct. 11, 2007

(51) Int. Cl.
*F01D 5/18* (2006.01)

(52) U.S. Cl. .................... 416/97 R; 415/115

(58) Field of Classification Search .......... 416/92
See application file for complete search history.

(56) References Cited

U.S. PATENT DOCUMENTS

| 4,142,824 | A |   | 3/1979  | Andersen |
| 4,197,443 | A |   | 4/1980  | Sidenstick |
| 4,390,320 | A |   | 6/1983  | Eiswerth |
| 4,540,339 | A | * | 9/1985  | Horvath ........................ 416/92 |
| 4,684,323 | A |   | 8/1987  | Field |
| 4,762,464 | A |   | 8/1988  | Vertz et al. |
| 4,893,987 | A |   | 1/1990  | Lee et al. |
| 4,992,025 | A |   | 2/1991  | Stroud et al. |
| 5,261,789 | A |   | 11/1993 | Butts et al. |
| 5,476,364 | A |   | 12/1995 | Kildea |
| 5,564,902 | A |   | 10/1996 | Tomita |
| 5,660,523 | A |   | 8/1997  | Lee |
| 6,059,530 | A |   | 5/2000  | Lee |
| 6,086,328 | A |   | 7/2000  | Lee |
| 6,164,914 | A |   | 12/2000 | Correia et al. |
| 6,224,336 | B1 |  | 5/2001  | Kercher |
| 6,527,514 | B2 |  | 3/2003  | Roeloffs |
| 6,554,575 | B2 |  | 4/2003  | Leeke et al. |
| 6,595,749 | B2 |  | 7/2003  | Lee et al. |
| 6,672,829 | B1 |  | 1/2004  | Cherry et al. |
| 6,790,005 | B2 |  | 9/2004  | Lee et al. |
| 6,994,514 | B2 | * | 2/2006  | Soechting et al. ........... 415/115 |
| 2003/0021684 | A1 | * | 1/2003 | Downs et al. ................. 416/92 |

* cited by examiner

*Primary Examiner*—Edward Look
*Assistant Examiner*—Dwayne J White
(74) *Attorney, Agent, or Firm*—William S. Andes; Francis L. Conte

(57) ABSTRACT

A turbine blade includes a hollow airfoil having a plurality of bowed tip holes extending through a tip floor thereof and skewed toward a squealer rib extending outwardly from the floor.

27 Claims, 5 Drawing Sheets

SKEWED TIP HOLE TURBINE BLADE

BACKGROUND OF THE INVENTION

The present invention relates generally to gas turbine engines, and, more specifically, to turbine rotor blades therein.

In a gas turbine engine air is pressurized in a compressor and mixed with fuel in a combustor for generating hot combustion gases. Energy is extracted from the combustion gases in a high pressure turbine (HPT) for powering the compressor, and in a low pressure turbine (LPT) for powering an upstream fan in a aircraft turbofan engine application, or for powering an output shaft for marine and industrial applications.

The first stage turbine rotor blade first receives the hot combustion gases from the combustor and is therefore subject to the high temperature thereof. Accordingly, first stage turbine blades are formed of state-of-the-art superalloy metals which maintain strength in the hostile environment of the HPT for maximizing blade life in service.

Furthermore, each turbine blade is hollow and includes specifically configured cooling circuits therein which use a portion of air bled from the compressor for internally cooling the turbine blade during operation, as well as providing an external film of thermally insulating air from the spent air discharged from the turbine airfoil through various rows of film cooling holes.

Each blade includes an airfoil extending outwardly from a platform joined to a dovetail for individually mounting the blades in the perimeter of a supporting rotor disk. The airfoil has a generally concave pressure side and a generally convex suction side which extend radially in span from the root of the airfoil at the platform to its radially outer tip, and also extend axially in chord between opposite leading and trailing edges.

The cooling circuits found in the airfoil may have a myriad of configurations specifically tailored for cooling the different portions of the airfoil differently against the different heat loads from the combustion gases channeled over the opposite pressure and suction sides. The concave-convex configuration of the airfoil creates different velocity and pressure distributions over the surfaces thereof for maximizing efficiency of energy extraction from the combustion gases for rotating the supporting disk during operation.

Accordingly, the heat loads from the combustion gases vary from root to tip and from leading edge to trailing edge in complex three dimensional patterns, which in turn affect the local cooling requirements of the different portions of the airfoil.

Each airfoil has a maximum thickness immediately aft of the leading edge and tapers to a thin trailing edge. Each airfoil typically also includes a small extension of the pressure and suction sides at the tip of the airfoil which defines a squealer rib surrounding an open tip cavity extending from a tip floor which encloses the top of the internal cooling circuits.

The leading edge of each airfoil that first receives the hot combustion gases, the thin trailing edge of each airfoil, and the small squealer rib at the airfoil tip are differently configured, have different functions, and have problems specific to the configurations thereof for obtaining adequate cooling to ensure a long useful life of the turbine blade in service operation.

Modern turbine blades have undergone decades of development which has substantially increased their useful life to many years or thousands of hours of operation in a gas turbine engine without undesirable thermal distress which would limit their useful lives. However, the life of the turbine blade is nevertheless limited by local thermal distress in any region thereof notwithstanding the distress-free performance of the majority of the blade.

For example, the turbine blade tip is one region of the blade which is difficult to adequately cool over the desired long useful life of the blade. The squealer rib around the airfoil tip is provided as a local extension of the pressure and suction sides for minimizing the radial gap or clearance between the tip and the surrounding turbine shroud to minimize undesirable leakage of the combustion gases therethrough during operation. Since turbine blades are subject to occasional rubbing with the surrounding turbine shroud, the small squealer ribs reduce the adverse affects of tip rubbing while ensuring integrity of the tip floor which encloses the internal cooling circuit.

The squealer rib itself is solid material and relatively thin, and is bathed in the hot combustion gases that flow axially along the pressure and suction sides during operation, as well as radially over the pressure side, and through the tip gap with the surrounding turbine shroud as the gases leak over the tips during operation. The squealer ribs are therefore subject to heating from both their outboard sides and inboard sides within the tip cavity, as well as along their radially outermost edges. And, the tips are subject to the high centrifugal velocities of the airfoil tips during rotation, and the high velocity of the hot combustion gases which flow downstream thereover during operation.

Accordingly, the prior art is replete with various configurations for cooling turbine blade tips having different complexity, different performance, and different effectiveness in an operating engine over its intended long useful life.

Turbine blade tips typically include a plurality of tip holes extending perpendicularly through the tip floor for filling the tip cavity with spent cooling air from the internal cooling circuit. In this way, the spent cooling air opposes ingestion of the hot combustion gases in the tip cavity for improving tip cooling.

Furthermore, film cooling holes are typically found near the blade tip on the pressure side for creating film cooling over the pressure side squealer rib during operation. In both configurations, the spent cooling air provides local film cooling of the outboard and inboard surfaces of the squealer rib.

Since the spent cooling air is discharged through the tip holes under pressure, the air is discharged in discrete jets at high velocity perpendicular to the tip floor which limits the cooling effectiveness thereof. Accordingly, symmetrical diverging tip holes may be introduced through the tip floor for diffusing the discharged air to decrease the velocity thereof and correspondingly increase the pressure for enhancing cooling inside the tip cavity.

In yet another conventional tip cooling arrangement, cylindrical tip holes may be inclined through the tip floor for impingement cooling the inner or inboard surfaces of the squealer rib, particularly on the airfoil pressure side having the greatest heat load therein. However, since the tip holes have relatively small diameters they cannot be manufactured in the original casting of the blade itself, but must be formed by post-casting drilling. Drilling requires access to the tip floor without damaging the cast squealer ribs. To be effective, inclined tip holes must be positioned closely adjacent to the squealer rib, but the squealer rib would thereby interfere with the fabrication of the close tip holes.

Accordingly, the inclined tip holes must firstly be fabricated prior to formation of the squealer rib, and then the squealer rib must be fabricated which increases the difficulty and cost of manufacture and destroys the unitary nature between the squealer rib and main airfoil typically manufactured with superalloys that are directionally solidified or single crystal alloys.

Accordingly, it is desired to provide a turbine rotor blade having improved tip cooling.

BRIEF DESCRIPTION OF THE INVENTION

A turbine blade includes a hollow airfoil having a plurality of bowed tip holes extending through a tip floor thereof and skewed toward a squealer rib extending outwardly from the floor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
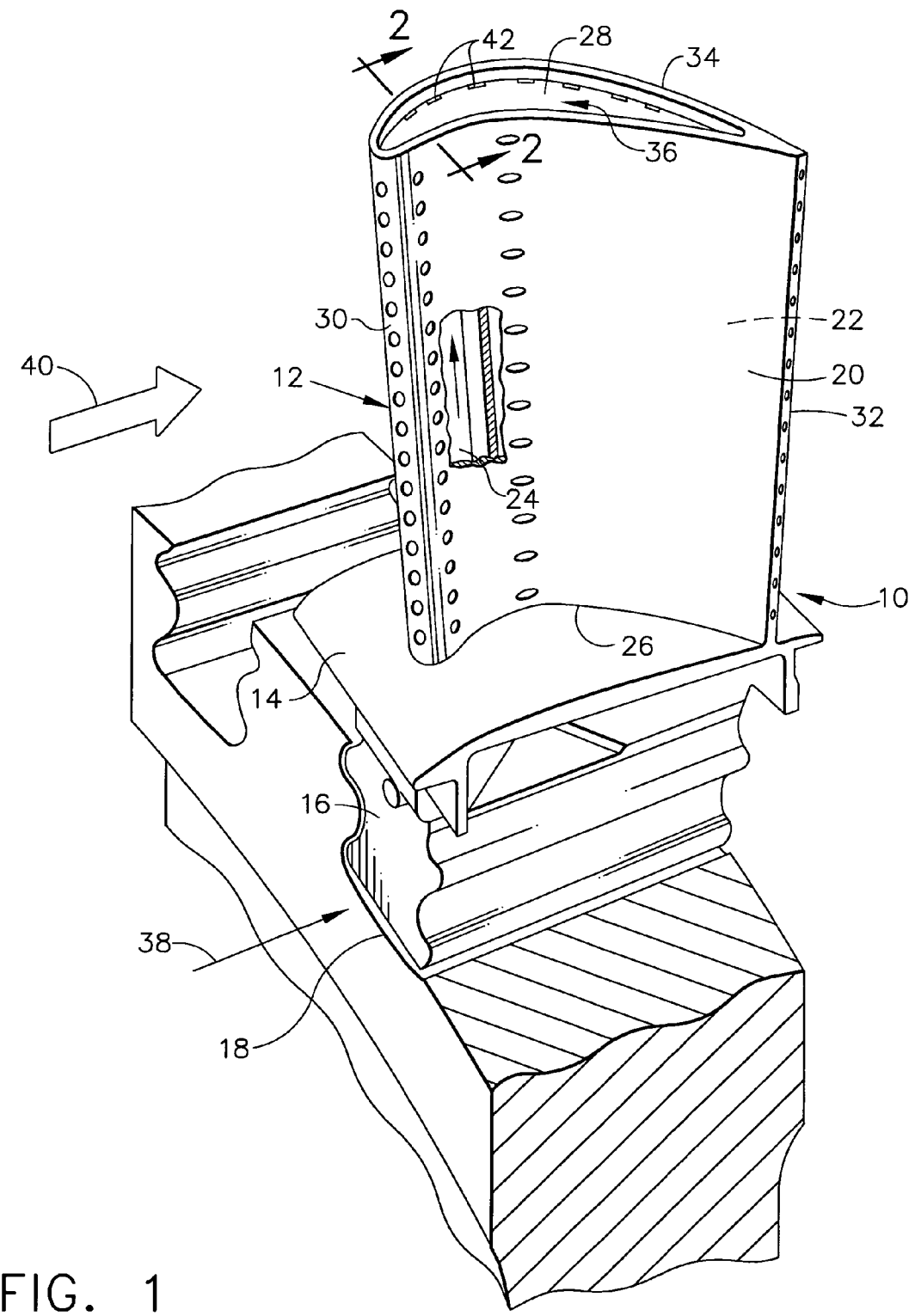
FIG. 1 is a isometric view of an exemplary gas turbine engine, first stage rotor blade extending radially outwardly from the perimeter of a supporting rotor disk, shown in part.

Illustrated in FIG. 1 is an exemplary HPT turbine rotor blade 10 for use in a gas turbine engine. The blade includes a hollow airfoil 12 extending radially outwardly from a platform 14 which is integrally formed with a supporting dovetail 16. The dovetail is configured for supporting the blade in a corresponding slot in the perimeter of a turbine rotor disk 18, shown in part.

The airfoil 12 includes a generally concave pressure sidewall 20 and a circumferentially opposite, generally convex suction sidewall 22 which are spaced transversely apart to define an internal cooling circuit or channels 24 therein. The airfoil also extends in radial or longitudinal span from a radially inner root 26 at the junction with the platform 14 to a radially outer, flat tip floor 28 at the opposite distal tip end of the airfoil. The two sidewalls also extend axially in chord between opposite leading and trailing edges 30,32.

A small squealer rib 34 extends integrally from the sidewalls 20, 22 around the circumference of the tip floor 28 in a unitary or integral casting with the airfoil. The squealer rib extends along both sidewalls between the leading and trailing edges to define a tip cavity 36 atop the floor which is open radially outwardly and faces the surrounding turbine shroud (not shown) when installed in the gas turbine engine.

During operation, pressurized cooling air 38 is bled from the compressor of the engine (not shown) and channeled through the base of the dovetail having one or more inlets joined in flow communication with the internal cooling circuit 24 of the blade. The airfoil may have any conventional cooling circuit therein and discharges the spent cooling air through various rows of film cooling holes and trailing edge holes of any conventional design and configuration.

In this way, the cooling air is first used to internally cool the airfoil, and then is discharged through the film cooling holes along both the pressure and suction sidewalls thereof for forming corresponding thin films of cooling air that provide thermal insulation against the hot combustion gases 40 discharged from the combustor (not shown).

As indicated above in the Background section, the tip region of the blade 10 is particularly difficult to cool in view of the small squealer rib 34 that bounds the perimeter thereof and is directly exposed to the hot combustion gases along both outboard sides of the pressure and suction sidewalls, as well as along the inboard sides of the rib as the combustion gases flow or leak over the squealer rib during operation.

Accordingly, the turbine blade illustrated in FIG. 1 includes an improved configuration for tip cooling in which a plurality of bowed tip holes 42 extend through the tip floor 28 in flow communication with the cooling circuit 24 for receiving cooling air therefrom.

Figure 2:
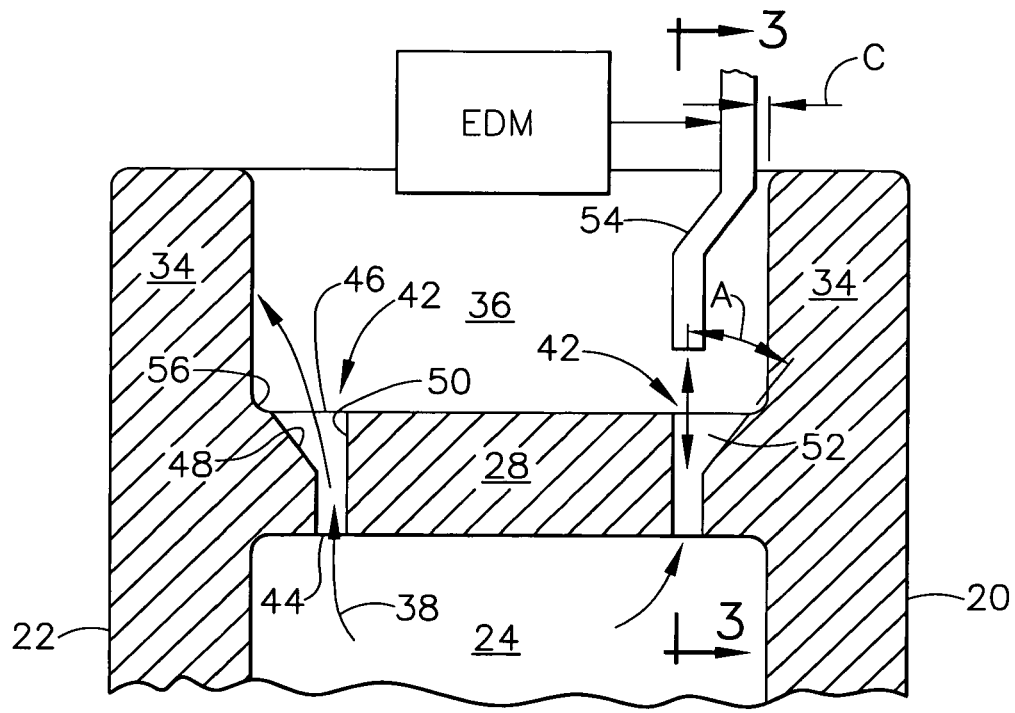
FIG. 2 is a elevational sectional view of the airfoil tip illustrated in FIG. 1 and taken along line 2-2.

The tip holes 42 are illustrated in FIG. 2 in accordance with an exemplary embodiment in which the corresponding holes 42 are skewed or bowed towards the squealer rib 34 on each side of the airfoil for directing the cooling air 38 at a shallow or oblique glancing angle therewith. The squealer rib 34 is preferably integrally cast with the airfoil itself with a typical superalloy metal for enhanced strength at elevated temperature, and the tip holes 42 are disposed through the floor 28 closely adjacent to the base of the rib 34 where it joins the floor. The holes have an outboard skew towards the inner surface or face of the squealer rib 34 for biasing or directing the cooling air discharged from the holes transversely toward the inboard surfaces of the rib for enhancing cooling effectiveness thereof.

As shown in FIG. 2, each of the tip holes 42 includes a straight inlet 44 extending through the bottom of the floor 28 in flow communication with the cooling circuit 24 for receiving the inlet air therefrom. Each hole 42 also includes an integral outlet 46 which is skewed or bowed from the inlet 44 toward the inboard surface of the adjacent rib 34. The outlet 46 is slanted or inclined outboard towards the squealer rib 34 for in turn biasing or bending the air jet from the outlet 46 against the inner surface of the rib for providing a form of oblique impingement cooling thereof, and also forming a thin film of cooling air for improving thermal insulation from the air.

Figure 3:
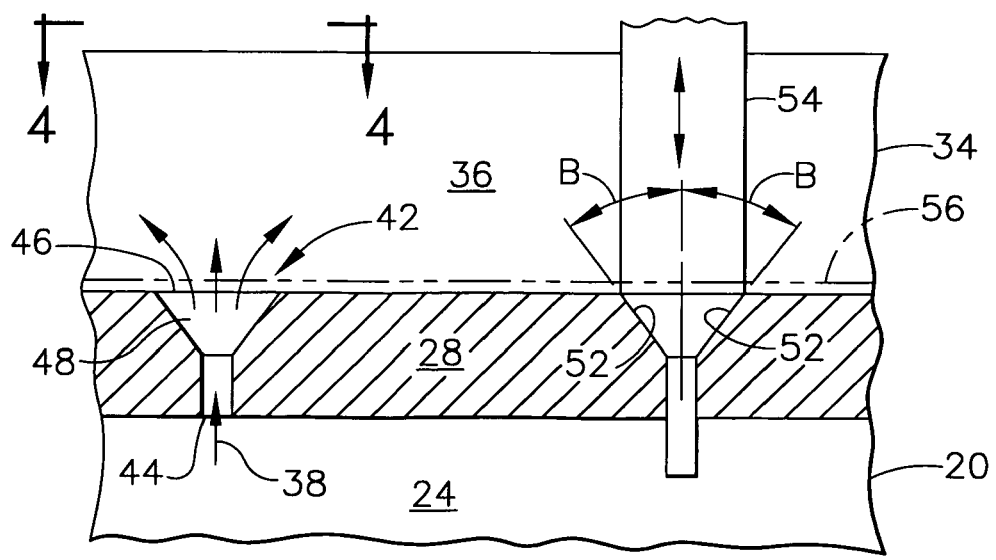
FIG. 3 is an axial side elevational view through the airfoil tip illustrated in FIG. 2 and taken along line 3-3.

The tip hole 42 is illustrated in transverse section in FIG. 2 and in lateral section in FIG. 3, with the outlet 46 thereof diverging or increasing in flow area from the inlet 44 for directionally diffusing the cooling air 38 discharged therethrough outboard towards the squealer rib 34 in contradistinction to inboard toward the middle of the tip cavity.

Figure 4:
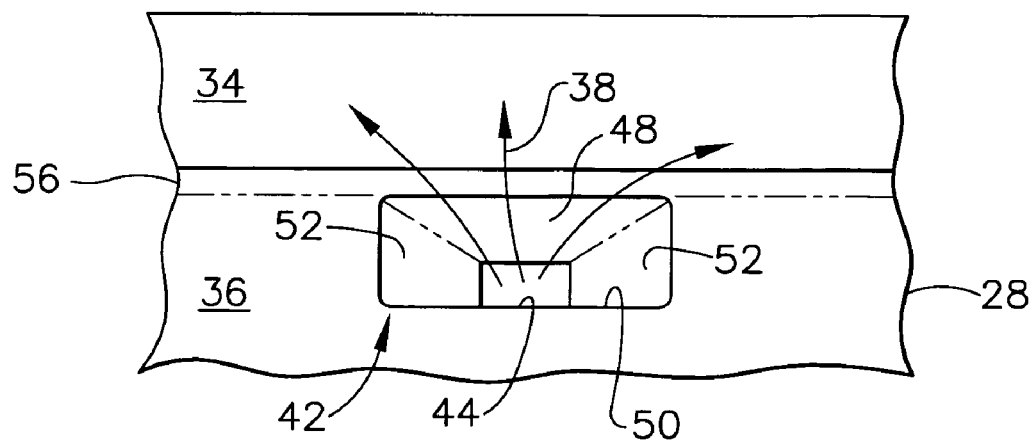
FIG. 4 is a top view of the airfoil tip illustrated in FIG. 3 and taken along line 4-4.

The inlet 44 has a finite length of about half the thickness of the tip floor 28 and is preferably axisymmetrical along its centerline axis, and may be rectangular in configuration as illustrated in FIG. 4, or it may be square, round, or oval as desired for performance and for manner of manufacture.

Correspondingly, the outlet 46 is preferably asymmetric transversely toward the rib 34 as illustrated in FIG. 2, while also being symmetric laterally along the rib 34 as illustrated in FIG. 3.

In this way, the air jet discharged from each tip hole 42 is biased to bend outboard toward the inner surface of the squealer rib 34 as illustrated in FIG. 2, while also spreading both forward toward the leading edge and aft toward the trailing edge laterally along the side of the rib 34 as illustrated in FIG. 3. The effective coverage area of the air discharged from each tip hole 42 is therefore maximized, while also biasing or bending the cooling air outboard to glance off the inner surface of the rib.

In the embodiment illustrated in FIGS. 2 and 3, the inlet 44 is vertical or substantially perpendicular with the floor 28, with the floor 28 being substantially flat. Correspondingly, the bowed outlet 46 includes a flat front wall 48 as shown in FIGS. 2 and 4 which is disposed closely adjacent to the base of the squealer rib 34, and is inclined at a shallow inclination angle A from the inlet 44 outboard towards the rib 34. Each outlet also includes a flat back wall 50 spaced inboard from the front wall 48 generally in line with the back surface of the inlet 44.

Completing the quadrilateral configuration of each outlet 46 is a pair of flat sidewalls 52 joining together the front and back walls 48,50 to enclose the perimeter of the outlet at correspondingly small arcuate junctions or fillets therebetween.

Since the skewed tip holes 42 illustrated in FIG. 2 are relatively small in flow area, they are preferably formed after the initial casting of the airfoil itself with an otherwise solid cast tip floor 28. In this way, the squealer ribs 34 are originally cast as extensions of the pressure and suction sidewalls 20,22 from which they extend and enjoy the same metallurgical properties therewith for the specific superalloy utilized for obtaining enhanced strength at the high temperature operation in the hostile environment of the gas turbine engine.

The individual tip holes 42 may then be manufactured by using a correspondingly configured electrical discharge machining (EDM) electrode 54 having a distal end configured to match the desired configuration of the skewed outlet hole 42. As shown in FIG. 2, the distal end of the EDM electrode 54 is configured to drill and match the configuration of the hole inlet 44, and includes an inclined jog matching the inclination angle A of the front wall 48 for forming the skewed outlet 48 of the tip hole.

The electrode 54 may then be lowered vertically into the tip cavity 36 closely adjacent to the squealer rib 34 and will drill the resulting tip hole 42 by the EDM process as the electrode is translated axially downwardly.

Since the outlet 46 is skewed outboard toward the rib 34, the corresponding electrode 54 has a corresponding jog inclined outboard toward the same rib 34 which is supported by a vertical shank spaced closely adjacent to the inner surface of the rib by a suitable spacing C. The spacing C should be sufficiently large to prevent stray EDM machining of the pre-cast squealer rib 34 as the electrode is lowered during the hole forming process.

The resulting inlet 44 of the tip hole formed by the EDM process may be relatively small with an effective diameter of about 10-15 mils (0.25-0.38 mm), with the transverse spacing C of the electrode shank having a similar magnitude to prevent stray discharge machining.

Since the back wall 50 is vertically straight in line with the inlet 44, and both are substantially perpendicular to the flat tip floor 28, the EDM electrode 54 requires only vertical translation to form the skewed tip holes 42 in one operation, including the inclined front wall 48 thereof.

As shown in FIG. 3, the pair of sidewalls 52 in the outlet 46 are inclined at similar or equal inclination angles B to diverge outwardly from the common inlet 44. Correspondingly, the EDM electrode 54 locally widens from its thin distal end in the jog region below the shank to correspondingly form the two sidewalls 52 in the common EDM formation of the tip hole 42.

The exemplary configuration of the tip holes illustrated in two orthogonal planes in FIGS. 2 and 3 may be derived from a conventional axisymmetric diffusion hole common in turbine blade cooling. Except, however, instead of being axisymmetrical, the tip holes 42 illustrated in FIG. 3 are only laterally symmetrical along the squealer rib 34 between the leading and trailing edges for spreading the discharged cooling air, but are asymmetric or non-symmetrical in the transverse section illustrated in FIG. 2 to bias or deflect the discharged cooling air outboard from the tip holes toward the adjacent inner surface of the squealer rib 34.

In a typical diffusion hole, the diffusion angle of the diverging wall is limited in value to avoid flow separation of the discharged cooling air from the diverging walls and maximize the diffusion effect. Furthermore, the conventional diffusion angle remains the same in the conventional axisymmetrical diffusion hole.

In the exemplary embodiment illustrated in FIGS. 2 and 3, the front wall 48 of the tip holes is inclined toward the rib 34 at an acute inclination angle A which is preferably greater than the inclination angle B of the outlet sidewalls 52. For example, the transverse inclination angle A may be about 27 degrees; and the lateral inclination angle B may be about 22 degrees, for a total lateral spread of about 44 degrees.

In this way, the air discharged from the tip holes may be spread laterally along the length of the squealer rib 34 as illustrated in FIG. 3, and may be skewed or bent to greater effect toward the base of the squealer rib 34. Since the front wall 48 is inclined and the back wall 50 is vertical, the air discharged from the tip hole will spread over the angular range therebetween. The front wall 48 is preferably disposed closely adjacent to the inboard surface of squealer rib 34, but is limited by the required offset clearance C illustrated in FIG. 2 to prevent stray discharge machining of the squealer rib itself when the holes are drilled.

The larger inclination angle A for the front wall 48 helps ensure that the discharged cooling air will have an increased cooling effect more closely adjacent to the base end of the squealer rib 34 that may then continue in elevation as the air flows up and past the distal end of the squealer rib.

The air glancing off the squealer rib from the tip holes effects a type of impingement cooling, which is otherwise perpendicular to a surface, as well as effects film cooling of the inner surface of the rib. Furthermore, excess inclination angles A of the front wall 48 may lead to flow separation of the discharged air to promote turbulence therein, with the turbulence increasing heat transfer to further improve cooling of the inner surface of the squealer rib.

FIGS. 2-4 illustrate one embodiment in which the squealer rib 34 integrally joins the tip floor 28 at a relatively small fillet 56 with a radius of about 5-20 mils (0.13-0.5 mm), and the outlet 46 of the tip holes terminates at or closely adjacent to the fillet 56. For example, the fillet 56 may be formed as small as practical for placing the tip holes 42 as close as practical to the inner surface of the squealer rib 34. And, the size of the fillet 56 may be selected to match the clearance C illustrated in FIG. 2 to ensure that the tip holes are positioned as close as possible to the squealer rib 34 without promoting stray EDM machining of the squealer rib itself during the hole drilling process.

Figure 5:
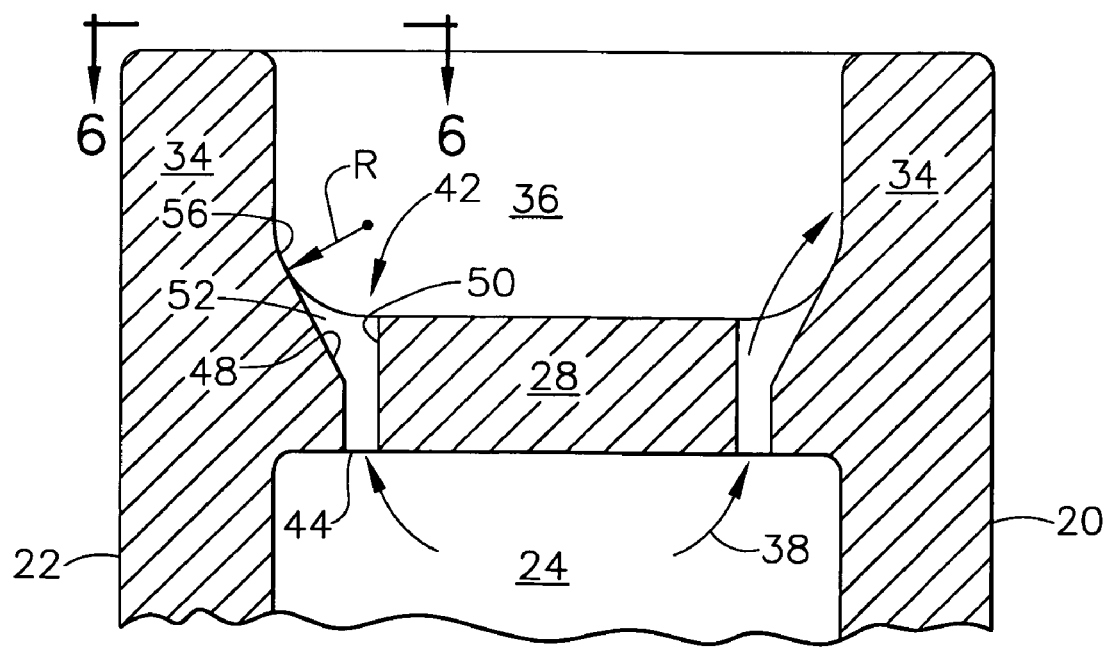
FIG. 5 is an elevational sectional view, like FIG. 2, of the airfoil tip in accordance with another embodiment.
Figure 6:
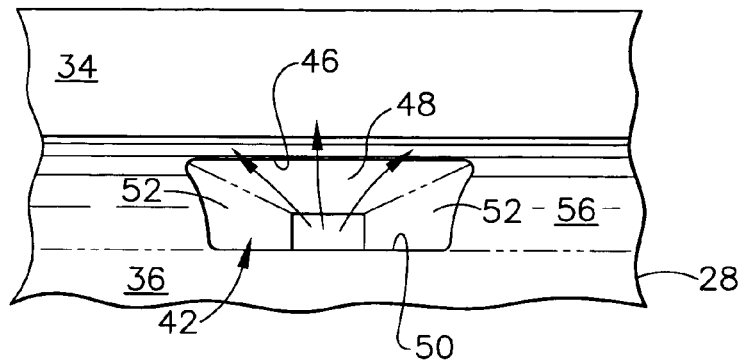
FIG. 6 is a top view of a portion of the airfoil tip illustrated in FIG. 5 and taken along line 6-6.

FIGS. 5 and 6 illustrate another embodiment of the tip holes 42 in which the fillet 56 at the base of the squealer rib 34 and tip floor 28 is relatively large, and sufficiently large so that the outlet 46 of the tip hole 42 terminates at least in part or wholly within the fillet 56. FIG. 5 illustrates the radius R of the fillet 56 which is sufficient to wholly contain the outlet of the tip hole 42.

In this way, the outlet of the tip hole increases in elevation from the vertical back wall 50 to the inclined front wall 48, with the two sidewalls 52 gradually increasing in elevation therebetween. The taller sidewalls may then be used for additionally confining the cooling air as it is discharged from the outlet. Furthermore, the increasing sidewalls also promote early cooling of the squealer rib 34 more closely adjacent to the base thereof which join the sidewalls at the large fillet 56.

Figure 7:
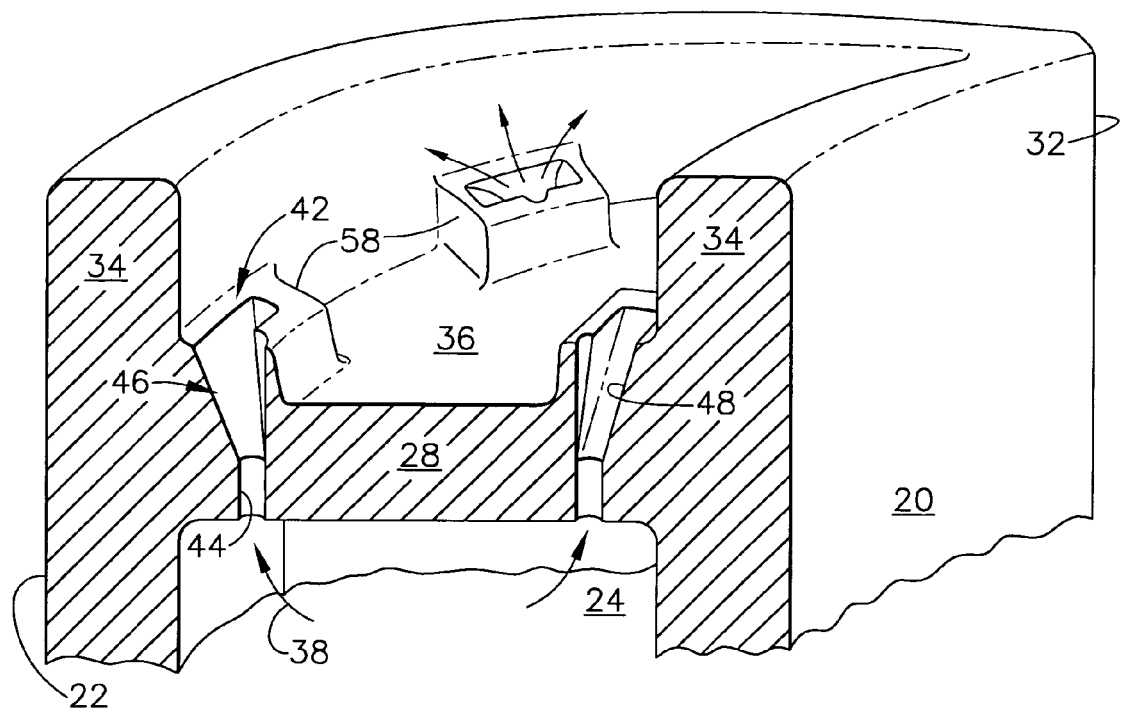
FIG. 7 is an isometric, sectional view of the tip portion of the airfoil illustrated in FIG. 1 in accordance with another embodiment, and taken generally along line 2-2.
Figure 8:
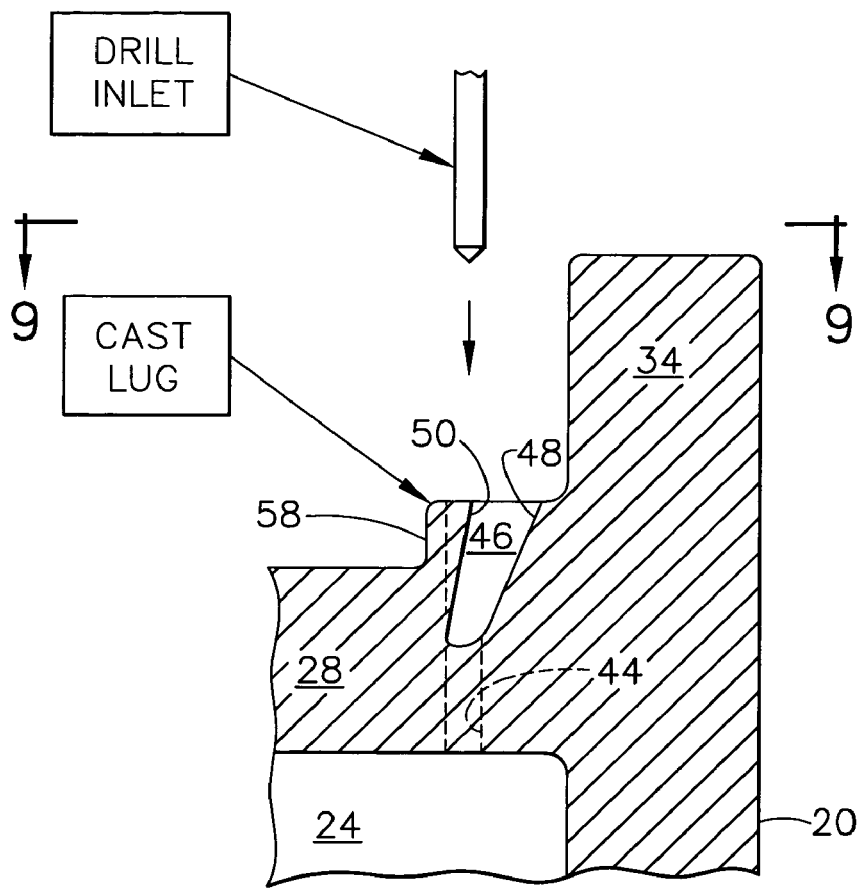
FIG. 8 is an enlarged elevational sectional view of a portion of the airfoil tip illustrated in FIG. 7 in accordance with a method of manufacture thereof.
Figure 9:
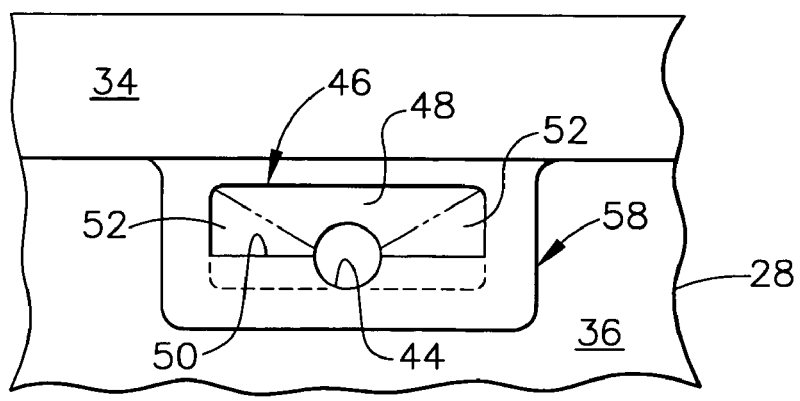
FIG. 9 is a top view of the portion of the airfoil tip illustrated in FIG. 8 and taken along line 9-9.

FIGS. 7-9 illustrate yet another embodiment of the skewed tip holes 42 wherein the tip cavity 36 includes a plurality of lugs or bosses 58 integrally joined or cast at the junction between the tip floor 28 and the base of the rib 34 and spaced laterally or chordally apart along the rib between the leading and trailing edges of the airfoil.

Each of the lugs 58 then provides a small plateau raised above the nominal elevation of the tip floor in which a corresponding one of the tip holes 42 may extend radially through the lug in flow communication with the internal cooling circuit 24. In this way, all four walls 48,50,52 of the hole outlet 46 may extend radially outwardly in elevation at the base of the corresponding squealer rib 34 for increasing internal convection cooling at the base of the rib, and further confining the discharge air to skew toward the inner surface of the squealer rib while being laterally spread along the chord direction of the rib.

Since the lugs are located at the radially outer end of the airfoil and generate centrifugal loads during operation, the tip floor 28 may remain relatively thin, with the lugs 58 being provided only locally to bound the outlets 46 of the corresponding tip holes and further control the discharge of the cooling air therefrom.

FIG. 8 illustrates schematically an exemplary method of making the turbine blade which is initially conventionally cast as a unitary component including the solid tip floor 28 and adjoining squealer rib 34, with the lugs being also integrally cast therewith. In this configuration, the outlet portions 46 of each tip hole 42 may be initially cast in the corresponding lugs 58 in view of their relatively large, diverging size. However, the small inlets 44 are too small for casting, and the tip floor 28 remains solid in this region after the casting process.

Accordingly, following the initial casting of the turbine blades, any conventional method may then be used for drilling the corresponding inlets 44 through the corresponding lugs 58 and tip floor 28 in flow communication with the internal cooling circuit 24. Since the outlet 46 is precast, the inlet 44 may be drilled vertically straight through the lug without the need for the offset EDM electrode illustrated in FIG. 2. Drilling of the inlet 44 may be accomplished using conventional laser drilling for example, or EDM drilling with a simple straight electrode of small size to match the intended size of the inlet 44.

A particular advantage of precasting the lug 58 is the ability to additionally cast the diverging and bowed outlet 46 in any desired configuration. For example, the back wall 50 of the outlet illustrated in FIGS. 8 and 9 may now be inclined from the inlet 44 outboard toward the squealer rib 34, and toward the also inclined front wall 48. The back wall 50 is inclined in the same direction as the front wall 48 but may have less of an acute inclination for diverging the outlet 46 between the inlet and squealer rib.

In this embodiment, the tip hole inlet 44 extends vertically or substantially perpendicular to the tip floor 28, and since the back wall 50 is inclined slightly, the inlet will extend in part through the middle of the back wall 50 as illustrated in FIG. 9 forming a local notch therein due to the drilling process. However, the remainder of the back wall 50 provides a slight overhang over the underlying inlet 44 to assist in skewing the discharged air flow to glance off the squealer rib 34.

In the various embodiments disclosed above, the inlet 44 will meter the discharged air to a given amount for the airfoil. The inlet 44 may have any suitable configuration from rectangular to round to oval as desired, and as manufactured in an economical manner.

The skewed outlet is asymmetric in the transverse direction toward the squealer rib being cooling and therefore permits all of the inlet air to be directed outboard toward the rib with minimal, if any, loss of the cooling air inboard toward the center of the tip cavity. The diverging configuration of the hole outlet may be used to advantage for diffusing the discharged cooling air while also bending or biasing the cooling air directly toward the squealer rib for enhanced cooling thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine rotor blade comprising:
   an airfoil extending outwardly from a platform at a root thereof integrally formed with a supporting dovetail;
   said airfoil including opposite pressure and suction sidewalls spaced apart to define an internal cooling circuit therein, and extending in span from said root to a tip floor at an opposite distal end, and extending in chord between opposite leading and trailing edges;
   a squealer rib extending from said sidewalls around said floor to define an open tip cavity thereatop; and
   a plurality of individual bowed tip holes extending through said floor in flow communication with said cooling circuit for receiving cooling air therefrom, and being asymmetrically skewed toward and terminating offset from said rib for directing said cooling air thereagainst.

2. A blade according to claim 1 wherein each of said tip holes includes a straight inlet extending substantially perpendicular through the bottom of said floor and a skewed outlet bowed from said inlet toward said rib.

3. A blade according to claim 2 wherein said outlet diverges in flow area from said inlet for diffusing said cooling air discharged therethrough.

4. A blade according to claim 3 wherein said outlet comprises:
   a flat front wall inclined from said inlet outboard toward said rib;
   a flat back wall spaced inboard from said front wall; and
   a pair of flat sidewalls joining together said front and back walls to enclose said outlet.

5. A blade according to claim 4 wherein said rib joins said floor at a fillet, and said outlet terminates at said fillet.

6. A blade according to claim 5 wherein said back wall is colinear with said inlet.

7. A blade according to claim 5 wherein said back wall is inclined from said inlet outboard toward said inclined front wall.

8. A blade according to claim 5 wherein said pair of sidewalls in said outlet are inclined to diverge outwardly from said inlet.

9. A blade according to claim 8 wherein said front wall is inclined toward said rib at an inclination angle greater than said inclination of said outlet sidewalls.

10. A blade according to claim 5 further comprising a plurality of lugs integrally joined to said floor and rib, and spaced apart therealong, and each of said lugs includes a corresponding one of said tip holes extending therethrough in flow communication with said cooling circuit.

11. A gas turbine engine blade comprising a hollow airfoil having a plurality of discrete tip holes extending through a tip floor thereof and asymmetrically bowed toward and terminating offset from a squealer rib extending outwardly from said floor.

12. A gas turbine engine blade comprising:
a hollow airfoil including opposite pressure and suction sidewalls extending in span from a root to a tip floor and extending in chord between opposite leading and trailing edges, and a squealer rib extending integrally from said sidewalls to define an open tip cavity; and
a plurality of individual tip holes disposed through said floor along the base of said rib and skewed asymmetrically outboard toward and terminating offset from said rib for directing cooling air thereagainst.

13. A blade according to claim 12 wherein each of said tip holes includes a straight inlet extending through the bottom of said floor and a skewed outlet bowed from said inlet toward said rib.

14. A blade according to claim 13 wherein said outlet diverges in flow area from said inlet for diffusing said cooling air discharged therethrough.

15. A blade according to claim 14 wherein said outlet is asymmetric transversely toward said rib and symmetric laterally along said rib.

16. A blade according to claim 14 wherein said inlet is axisymmetrical.

17. A blade according to claim 14 wherein said outlet is quadrilateral.

18. A blade according to claim 17 wherein said inlet is substantially perpendicular with said floor, and said outlet includes a front wall inclined from said inlet toward said rib.

19. A blade according to claim 18 wherein said outlet further includes a back wall spaced inboard from said front wall, and a pair of sidewalls joining together said front and back walls to enclose said outlet.

20. A blade according to claim 19 wherein said back wall is colinear with said inlet.

21. A blade according to claim 19 wherein back wall is inclined from said inlet outboard toward said inclined front wall.

22. A blade according to claim 19 wherein said pair of sidewalls in said outlet are inclined to diverge outwardly from said inlet.

23. A blade according to claim 22 wherein said front wall is inclined toward said rib at an inclination angle greater than said inclination of said outlet sidewalls.

24. A blade according to claim 14 wherein said rib joins said floor at a fillet, and said outlet is spaced by said fillet from said rib.

25. A blade according to claim 14 wherein said rib joins said floor at a fillet, and said outlet terminates within said fillet.

26. A blade according to claim 14 wherein said rib joins said floor at a plurality of lugs spaced apart between said leading and trailing edges, and said plurality of tip holes are disposed in corresponding ones of said lugs.

27. A blade according to claim 26 wherein:
said tip hole outlet includes front and back walls inclined from said inlet toward said rib; and
said tip hole inlet extends substantially perpendicular to said floor and in part through the middle of said back wall.

* * * * *